Feb. 17, 1953     R. S. SANFORD ET AL     2,628,699
PARKING METER MECHANISM

Filed May 28, 1948     11 Sheets-Sheet 1

INVENTORS
ROY S. SANFORD
JAMES OWEN EAMES
BY
*Burgess Ryan & Pheko*
ATTORNEYS

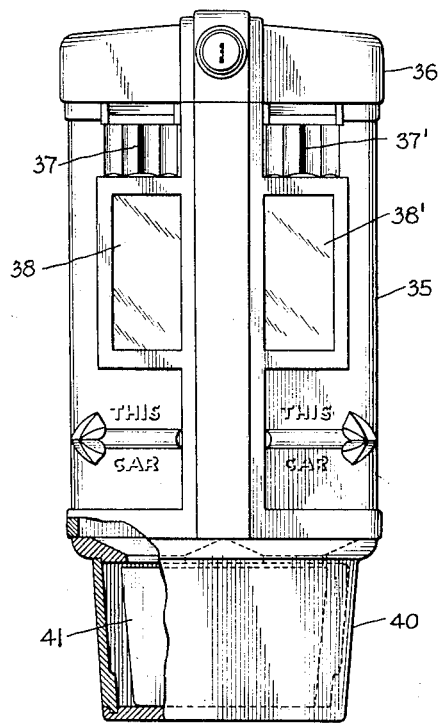
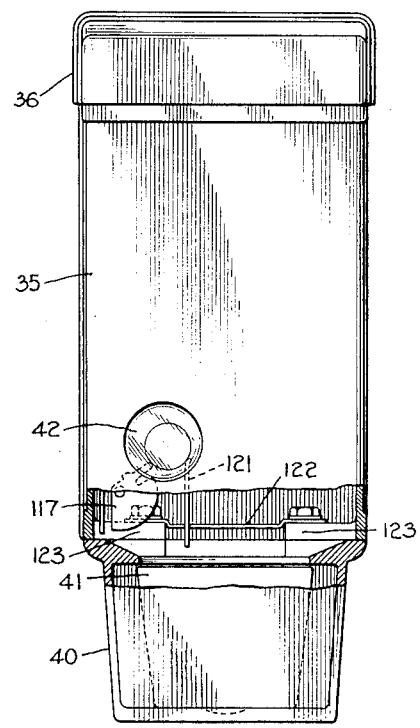
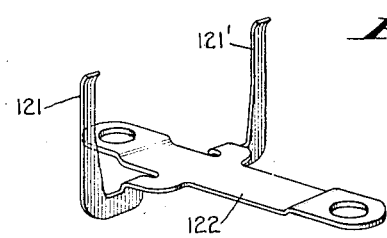

Feb. 17, 1953         R. S. SANFORD ET AL         2,628,699
                     PARKING METER MECHANISM
Filed May 28, 1948                          11 Sheets-Sheet 3

INVENTORS
ROY S. SANFORD
JAMES OWEN EAMES
BY
Burgess Ryan & Hicks
ATTORNEYS

Feb. 17, 1953 R. S. SANFORD ET AL 2,628,699
PARKING METER MECHANISM
Filed May 28, 1948 11 Sheets-Sheet 4
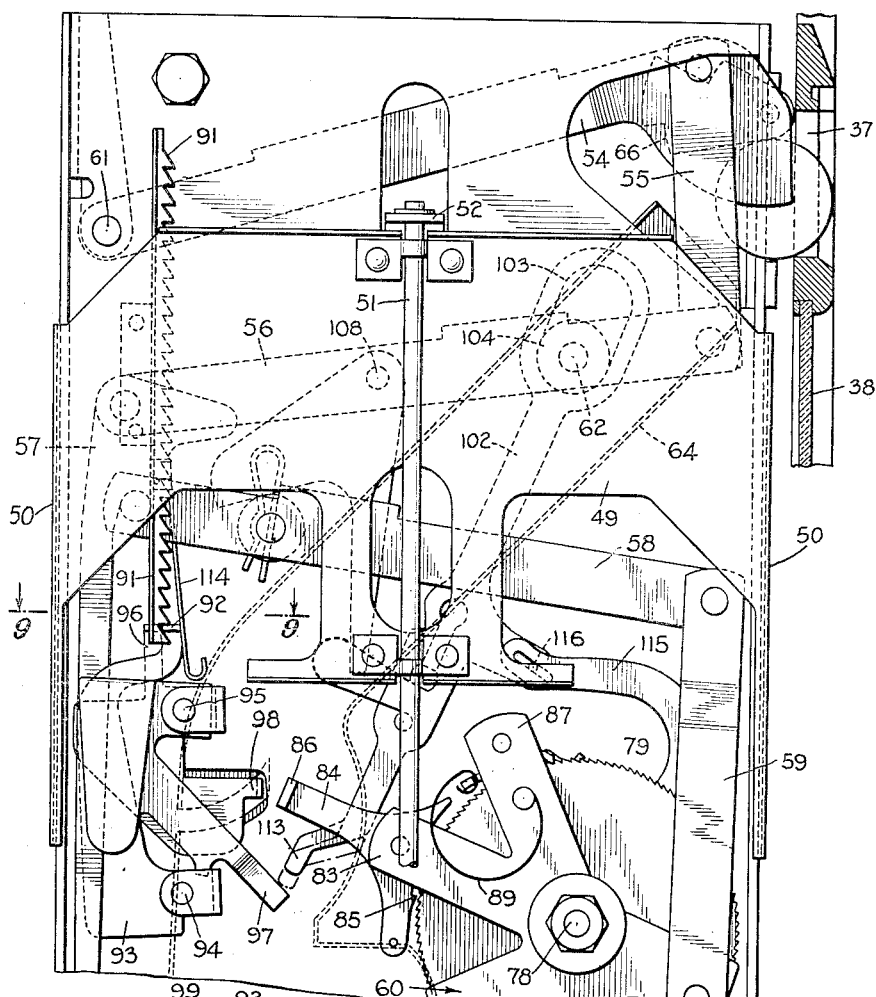
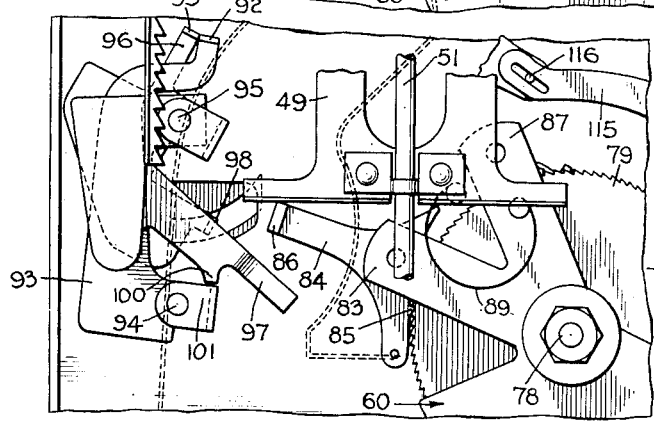
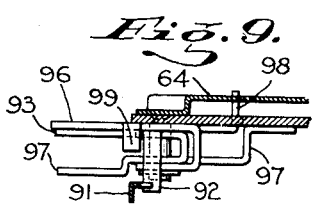
INVENTORS
ROY S. SANFORD
JAMES OWEN EAMES
BY
ATTORNEYS INVENTORS
ROY S. SANFORD
JAMES OWEN EAMES
BY
*Burgess, Ryan & Hicks*
ATTORNEYS

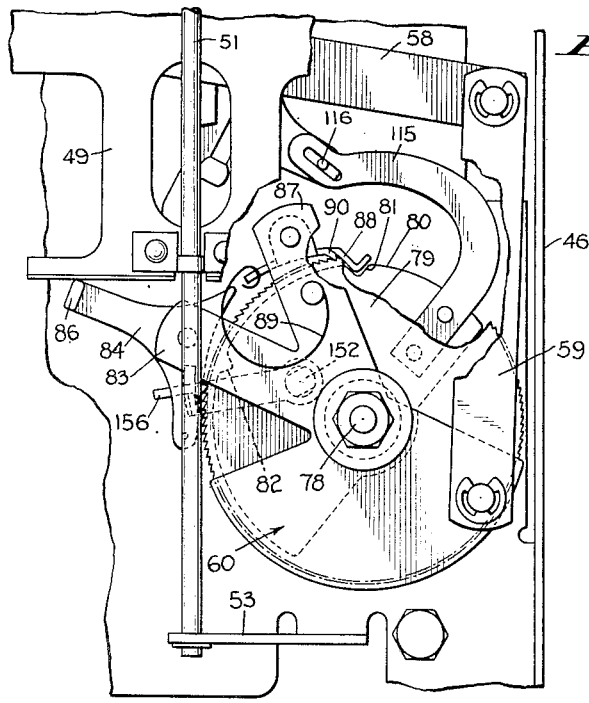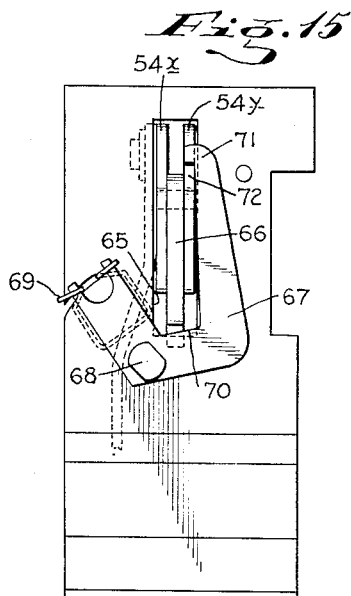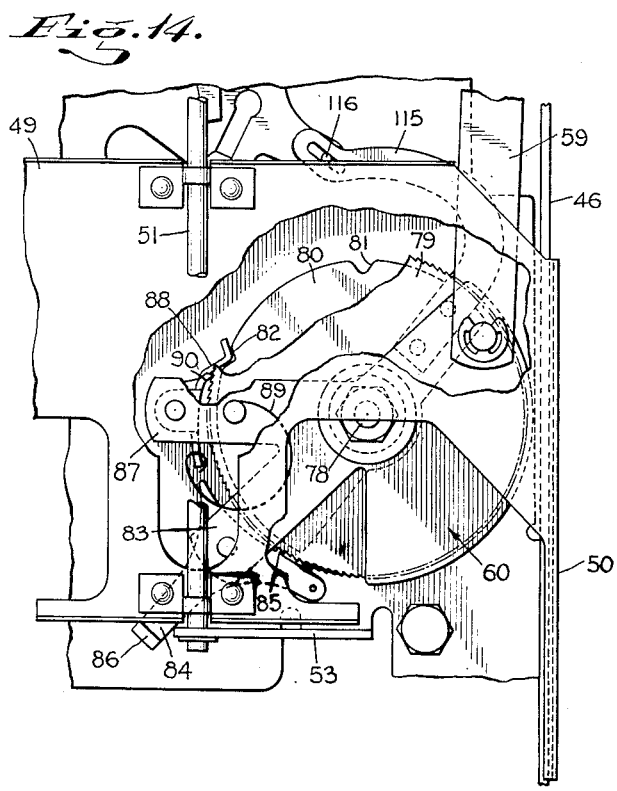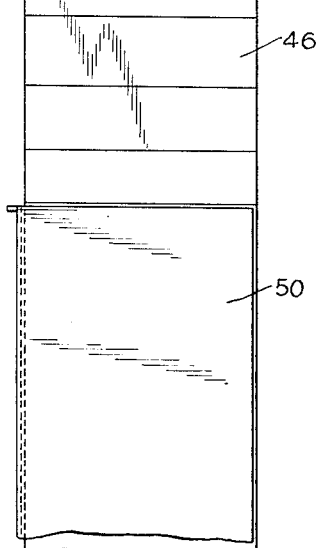

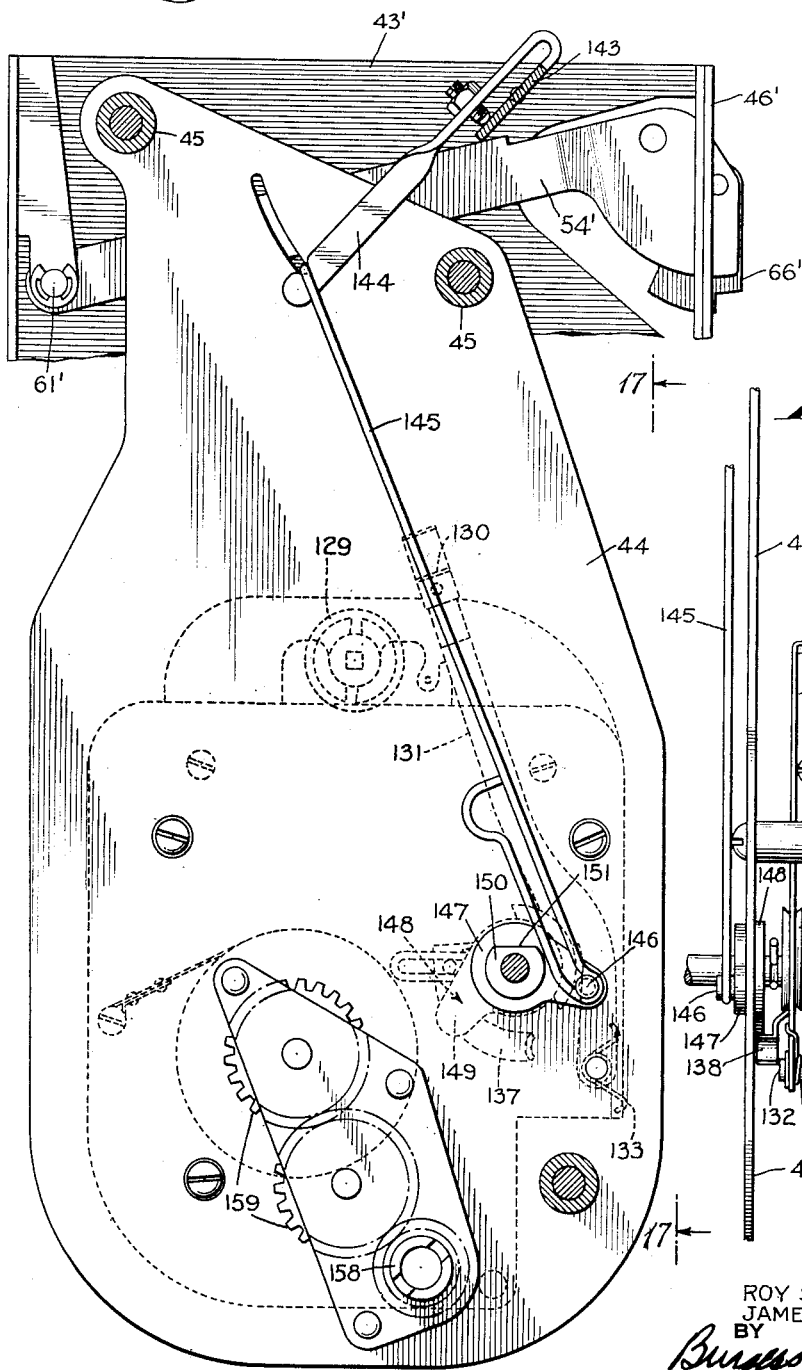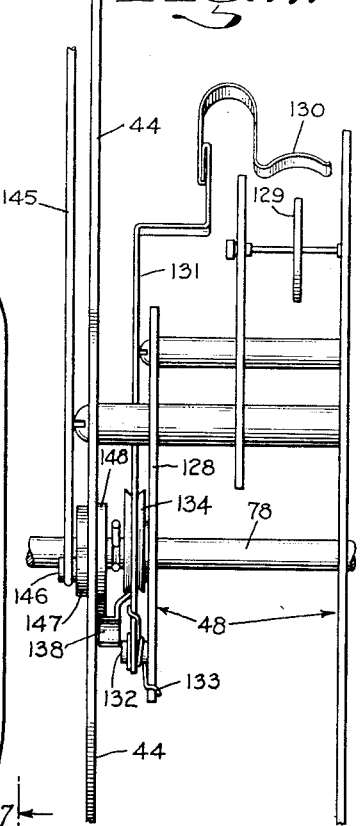

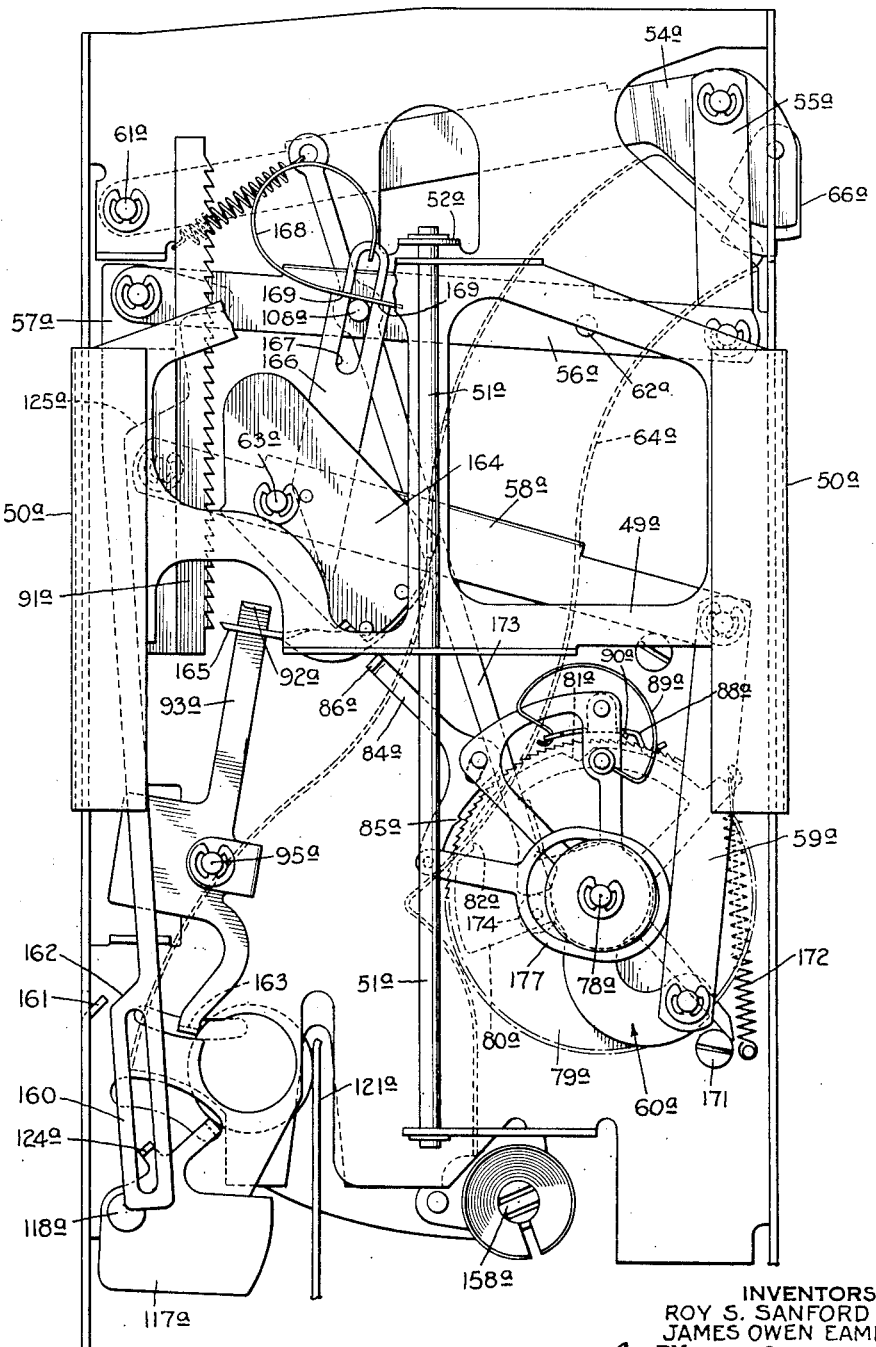

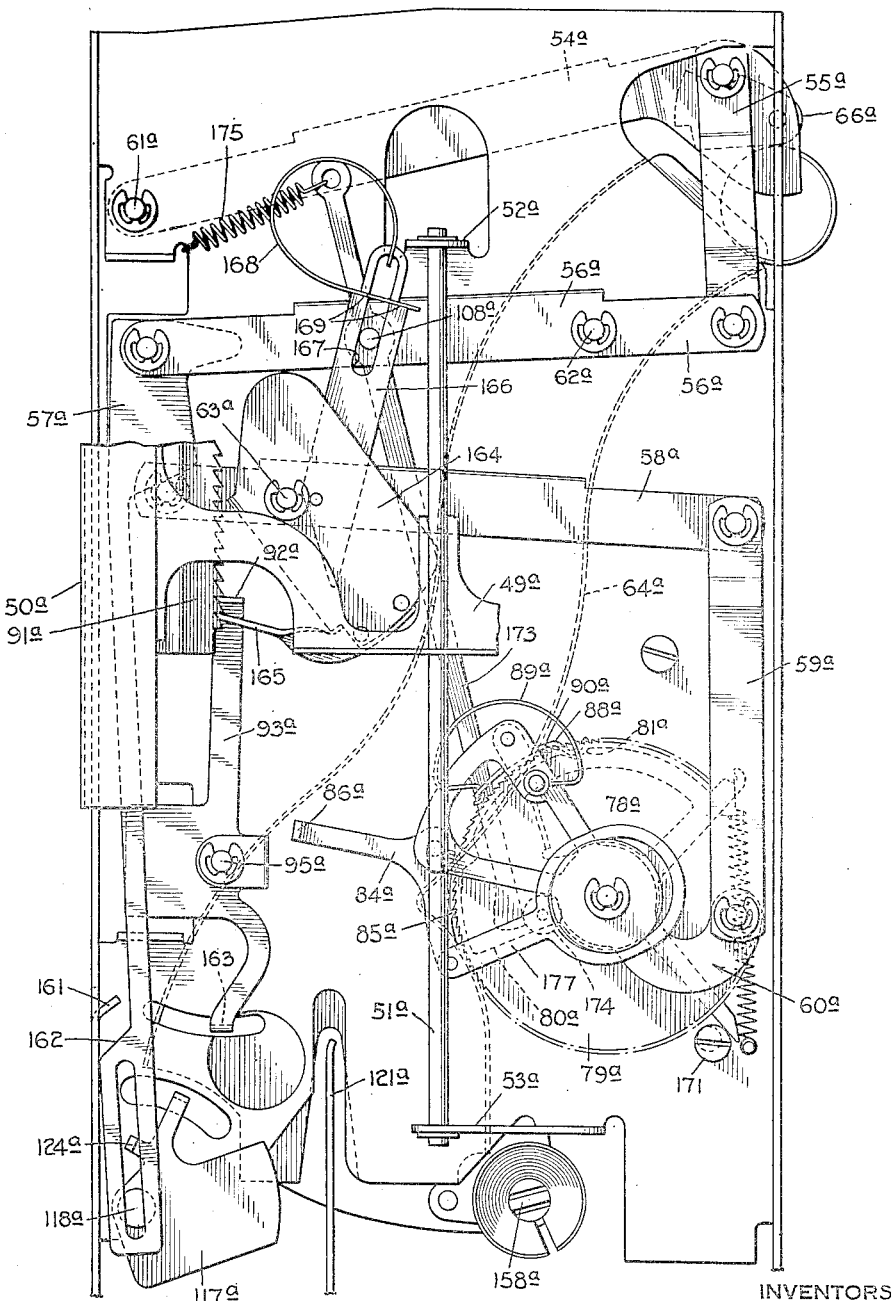

Feb. 17, 1953 R. S. SANFORD ET AL 2,628,699
PARKING METER MECHANISM
Filed May 28, 1948 11 Sheets-Sheet 11
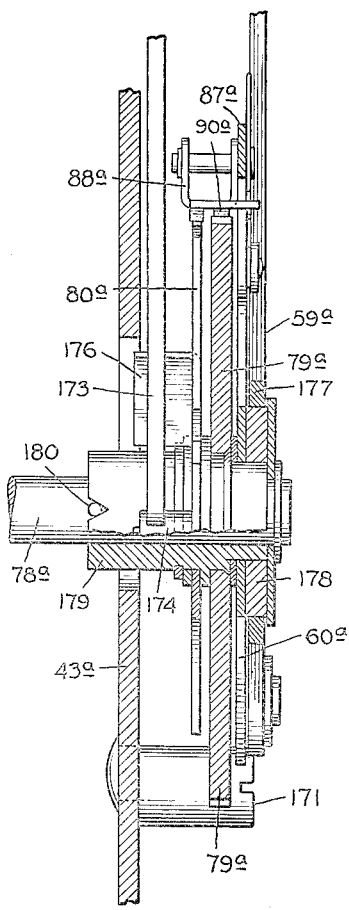
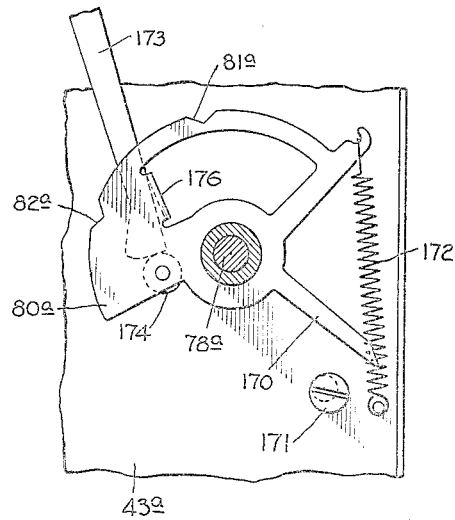
INVENTORS
ROY S. SANFORD
JAMES OWEN EAMES
BY
Burgess Ryan & Hicks
ATTORNEYS Patented Feb. 17, 1953

2,628,699

UNITED STATES PATENT OFFICE 2,628,699

PARKING METER MECHANISM

Roy S. Sanford, Woodbury, and James Owen Eames, Washington, Conn., assignors, by mesne assignments, to The Michaels Art Bronze Company Incorporated, Covington, Ky., a corporation of Kentucky Application May 28, 1948, Serial No. 29,728

23 Claims. (Cl. 194—72)

This invention relates to vehicle parking meters.

Such meters as heretofore commonly used have comprised one or the other of two general types, namely, manual or automatic. In the manual type, the customer is required to perform two separate operations consisting first in inserting a coin and second in manipulating a handle, the latter operation serving to energize the power supply, as by the loading of a spring or equivalently the raising of a weight. In the automatic type of meter, only one operation is required to be performed by the customer, that is, the insertion of a coin, which act serves to set the time indicator and start its return movement under the influence of some pre-energized power source, such as a clock-work.

The present invention provides a meter mechanism of the automatic type in the sense that no operation is required to be performed by the customer beyond the insertion of a coin, but in which that act of coin insertion potentially energizes the spring or equivalent device by which the time indicator is caused to move from purchased time to violation position.

It is one of the objects of this invention to provide a relatively simple meter of the above character incorporating certain basic components which are readily adaptable for operation by different coins and, in one and the same mechanism, by coins of different denomination, to permit the purchase of different parking periods.

Another object of the invention is to provide a mechanism of the foregoing character which is particularly well adapted for use in what have been referred to as plural parking space meters. By this expression is meant a single housing which incorporates at least two mechanism units, each capable of functioning independently of the other or others to control the parking of an individual vehicle.

With these and other objects and advantages in view, the invention comprises the arrangements and combinations hereafter described with reference to the accompanying drawings, of which:

Fig. 3 is a front elevation, partially broken out, of a plural parking space meter (minus the usual supporting post) incorporating mechanisms of the kind illustrated in detail in the remaining figures of the drawings;

Fig. 4 is a side view (left-hand side) of the meter of Fig. 3;

Fig. 5 is a perspective view of a detail;

Figs. 7 and 8 are broken-out elevations of parts of the mechanism shown in Fig. 6, but with some of the components in different positions assumed during the operation of the meter;

Fig. 9 is a view of a detail (partially sectioned) as on the line 9—9 of Fig. 7;

Figs. 13 and 14 are broken-out, elevational views of portions of the unit shown in Fig. 6 but with the parts in different operating positions;

Fig. 15 is an elevation of the front of one of the units (viewed as on the line 15—15 of Fig. 11);

Fig. 16 is an elevation of a part of the mechanism (viewed as on the line 16—16 of Fig. 11);

Fig. 17 is an elevation of part of the mechanism illustrated in Fig. 16 (viewed as on the line 17—17 of that figure);

Fig. 18 is an elevation corresponding to the showing of Fig. 6, but illustrating a modified form of mechanism;

Fig. 19 is a similar elevation of the modified mechanism, but with some of the parts occupying different positions;

Fig. 20 is an enlarged sectional view of the clock-shaft assembly of Figs. 18 and 19; and Fig. 21 is an elevation of the time delay cam of Figs. 18 and 19.

Figure 1:
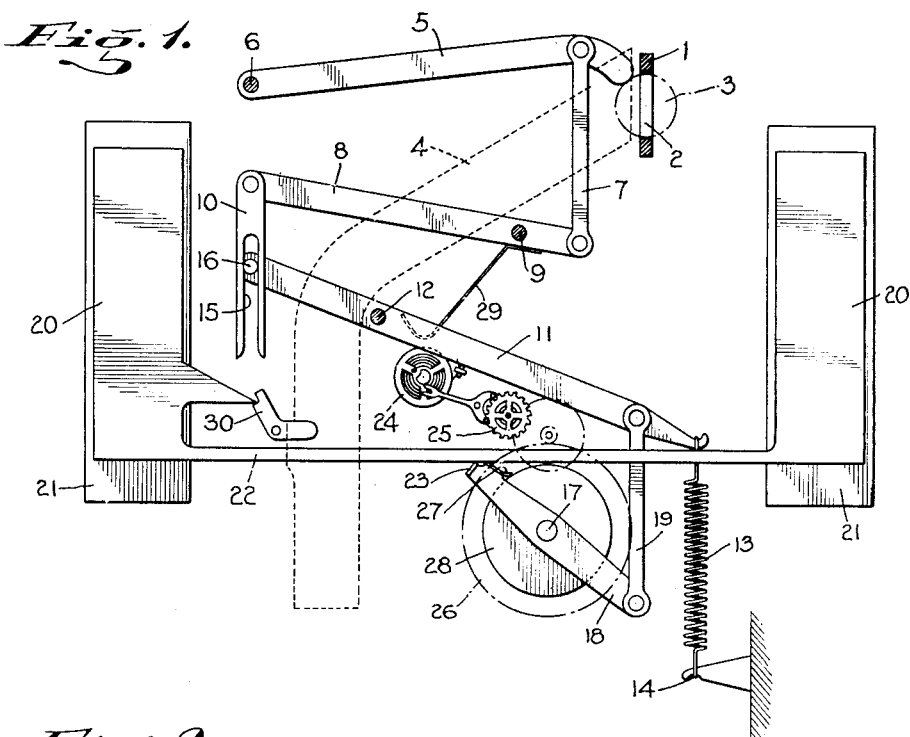
Fig. 1 is a diagrammatic view of a meter mechanism illustrating certain general principles of the preferred form of the invention.

Referring first to the diagrammatic showing of Fig. 1, the illustrated mechanism components (omitting any showing of the meter housing) include a plate 1 having a slot 2 dimensioned for the edge-wise receipt of a coin 3, the entering coin falling by gravity through a chute 4. Adjacent the coin slot is a meter activator having a portion obstructing one end of the slot and yieldable in response to the pressure of a hand-held coin. The illustrated activator consists of what for convenience will sometimes be referred to as the actuator or actuator lever 5 which is pivoted at 6 and which, when raised by the entering coin, operates through motion-multiplying linkage to potentially energize the power source, such as a counterbalance spring or its equivalent, by which the mechanism is operated through a purchased-time period.

The linkage consists of a primary link 7, a primary lever 8, pivoted at 9, a lost-motion link 10 and a secondary lever 11, pivoted at 12. One end of a counter-balance spring 13 (the power source) is attached to the free end of lever 11 and the other end of the spring is anchored at 14. The lost-motion link is slotted at 15, the closed end of the slot engaging a pin 16 in one end of secondary lever 11 when the actuator is raised by an entering coin.

Rotatable on a shaft 17 is a flag arm 18, one end of which is connected by a secondary link 19 with secondary lever 11, so that upon each insertion of a coin the actuator causes the described linkage to distend and thereby energize spring 13 and also rotate flag arm 18 (counterclockwise as viewed in Fig. 1).

The function of the so-called flag arm is to move an appropriate indicator between purchased-time and violation positions; and in the diagrammatic showing of Fig. 1, the indicator comprises a pair of flags 20 mounted in front of scale plates 21 and united by a cross bar 22 which rests on the bent over end 23 of flag arm 18. Thus, as the flag arm rotates clockwise, under the influence of spring 13, it raises the flags which, in due course, obscure time interval calibrations which may be marked on the scale plates.

As will be recognized, a mechanism of this type requires only that some simple form of timer be applied to control the rate of ascent of the flags.

In this instance, the timer is shown as consisting of a balance wheel 24 and escapement 25, the latter being driven through a suitable gear train from a gear 26 secured to shaft 17. The energy of spring 13 is also applied to operate the timer. Associated with the flag arm is a clutch, shown as consisting of a leaf spring 27 mounted on the flag arm with its free end engaging the periphery of a clutch disc 28 secured to shaft 17. As will be apparent, the bias of the leaf spring is such that the flag arm can rotate counterclockwise independently of the timer (the leaf spring sliding over the periphery of disc 28) but upon clockwise rotation of the flag arm the leaf spring tends to dig into the disc and so rotate it. In the result, the rotation of the flag arm by spring 13 is applied to operate the timer and to raise the flags at the speed determined by the timer, the scales being appropriately calibrated to provide whatever parking interval is pre-determined as appropriate for the inserted coin.

To insure starting of the timer, a light spring 29 is shown secured to lever 8 with its free end so positioned as to wipe across the balance wheel as the linkage is operated by the insertion of the coin.

As the precaution against the flags being dropped by the partial insertion of a coin or some other object, provision may be made whereby the meter is not fully set until after a coin has passed down the chute. To this end, the flags are shown as supported by a latch 30, one end of which protrudes into the chute so as to be struck and disengaged from the flag assembly by a descending coin. Thus, whereas the cocking of the spring mechanism is effected at the coin entrance (and the flag arm thereby swung down from flag supporting position) the flags do not actually fall to a purchased-time indicating position until the coin has been released and permitted to fall down the chute.

It will be recognized that this basic type of mechanism can be arranged to receive coins of different diameter, such as a penny and a nickel, for example, the larger diameter of the nickel serving to rotate the flag arm further than the penny and thereby purchase a parking time interval of longer duration. While the diameter difference between these two particular coins is relatively small, the coin induced motion is greatly multiplied, at the flag arm, by the described linkage; but, by introducing an appropriate amount of lost motion in the linkage, the flag arm movements effected by the two different coins can be made to approximate the different travel distances required by the relative values of the two coins. Slight discrepancies can be taken up in the calibration of the scale plates. In the illustrative diagram, the slot 15 in link 10 introduces the requisite lost motion.

Figure 2:
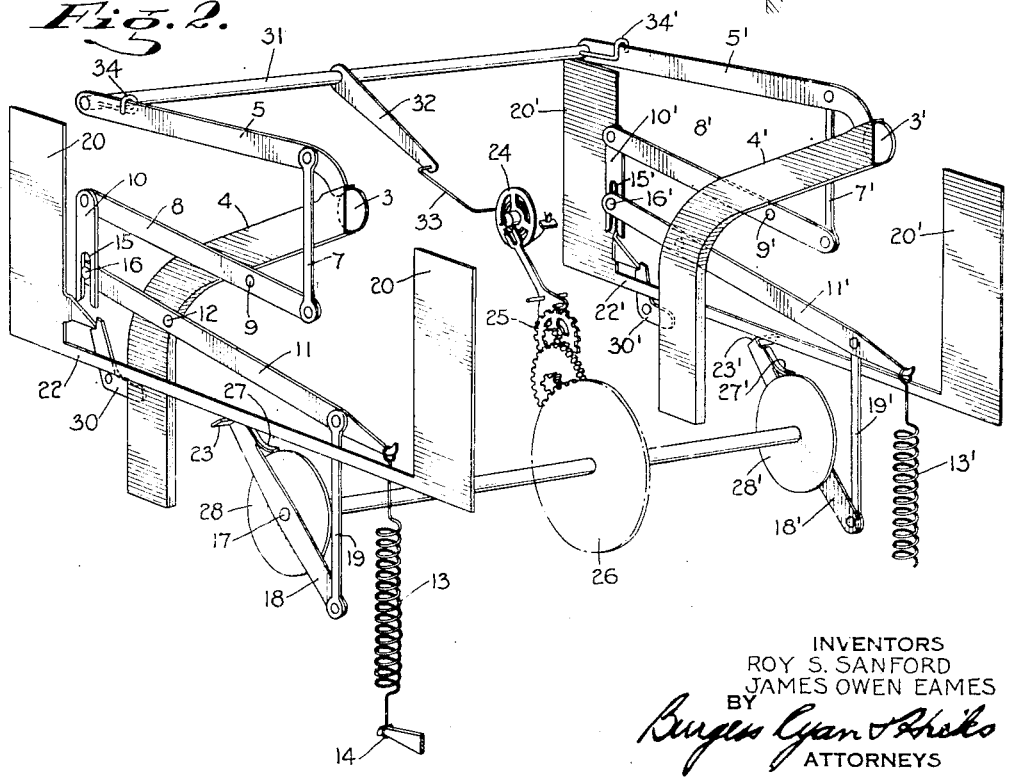
Fig. 2 is a perspective, diagrammatic view of a meter mechanism of the same general type as that shown in Fig. 1, but in a form in which it may be organized for use in a plural parking space meter.

Fig. 2 illustrates diagrammatically an application of the mechanism of Fig. 1 to a twin or two-unit plural parking space meter such as may be mounted in a single housing and adapted to control the parking of two vehicles. Except as indicated below, the left-hand unit of Fig. 2 is the same as the single unit of Fig. 1 and the parts are correspondingly numbered. The right-hand unit is likewise of the same construction and the same reference characters, primed, are applied to the corresponding parts.

In this arrangement the pivots for the actuators 5, 5' are the ends of a shaft 31 to which is secured an arm 32 which carries a light spring 33 corresponding to the spring 29 of Fig. 1 and adapted to wipe the balance wheel and start the timer in motion whenever a coin is inserted into either of the chutes 4, 4'. The raising of the actuator 5 is applied to rock shaft 31 and start the timer by a hook-shaped coupler 34, and similarly actuator 5' rocks the shaft through coupler 34'. Thus, each actuator can be raised by an entering coin to start the timer quite independently of and without interfering with the companion mechanism.

Similarly, shaft 17 carries clutch disc 28' as well as clutch disc 28, but by reason of the one-way drive connection afforded by the leaf springs 27, 27' the mechanisms are free to operate without interference.

The meter about to be described with reference to Figs. 3 to 17, inclusive, is essentially of the type illustrated diagrammatically in Fig. 2 but with the flags 20—20' occupying planes at right angles to those which they are indicated as occupying in Fig. 2; that is to say, the flags lie at right angles to, rather than in the planes of their cross-bars 22, 22'. Various other structural differences will be pointed out as the description proceeds, but the general arrangement is similar in principle to that already described.

Figure 6:
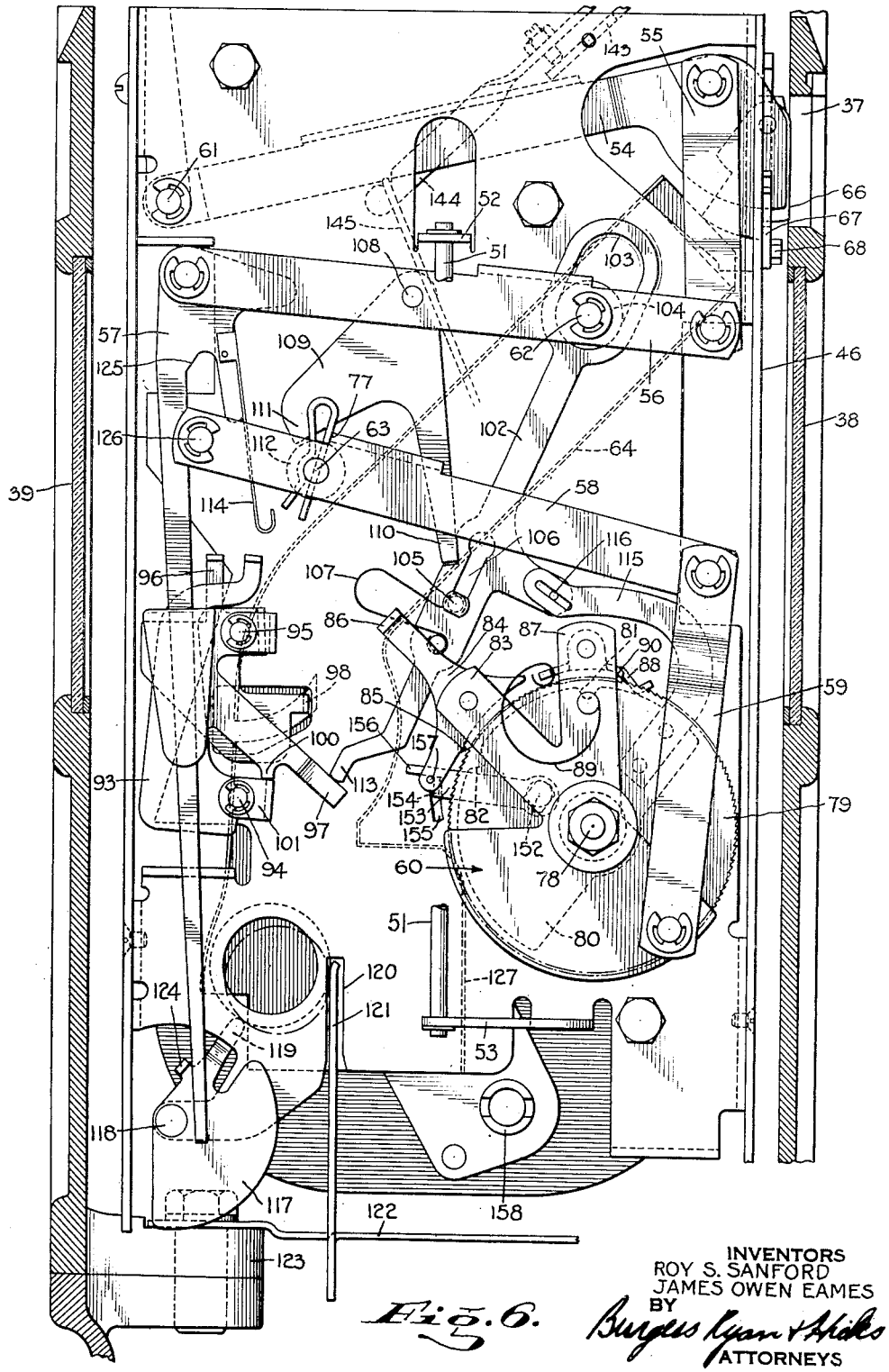
Fig. 6 is an elevation of the left-hand unit of the illustrated plural parking space meter (viewed as on the line 6—6 of Fig. 11)
Figure 10:
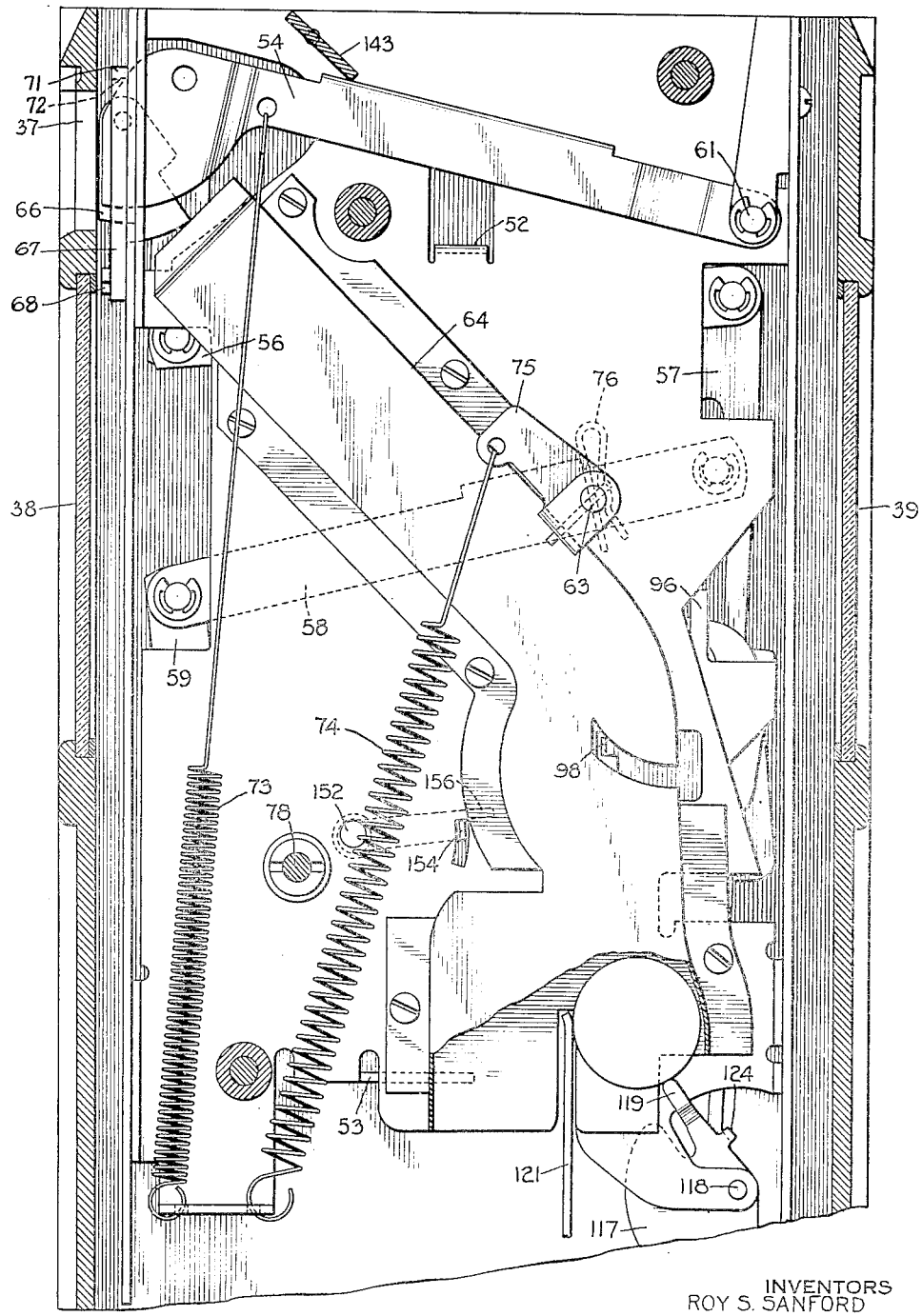
Fig. 10 is an elevation of the back of the mechanism shown in Fig. 6 (viewed as on the line 10—10 of Fig. 11)

Figs. 3 and 4 are front and left-hand side views, respectively, of a housing 35 appropriate for a twin meter of the kind referred to. The housing is enclosed on all sides and has a normally locked top cover 36 which may be opened to permit the bodily insertion and removal of the meter mechanism for inspection or servicing. In the front face of the housing are coin entrance slots 37, 37' and directly beneath the slots are windows 38, 38' which afford a view of the time scale and flag of the mechanism with which the particular slot is associated. The rear face of the housing may be provided with similar windows, of which one marked 39 is shown in Figs. 6 and 10, to expose a second time scale and flag for each half of the mechanism. Within the lower portion 40 of the housing is a coin box or receptacle 41 designed to receive all of the coins entering the meter by way of both slots. As is customary, the last deposited coin is arranged to be exposed to view and one of the windows for that purpose is shown in Fig. 4 marked 42, this being the window which exposes the coins deposited in slot 37. A similar window to expose coins deposited in slot 37' is located on the opposite side of the housing.

Figure 11:
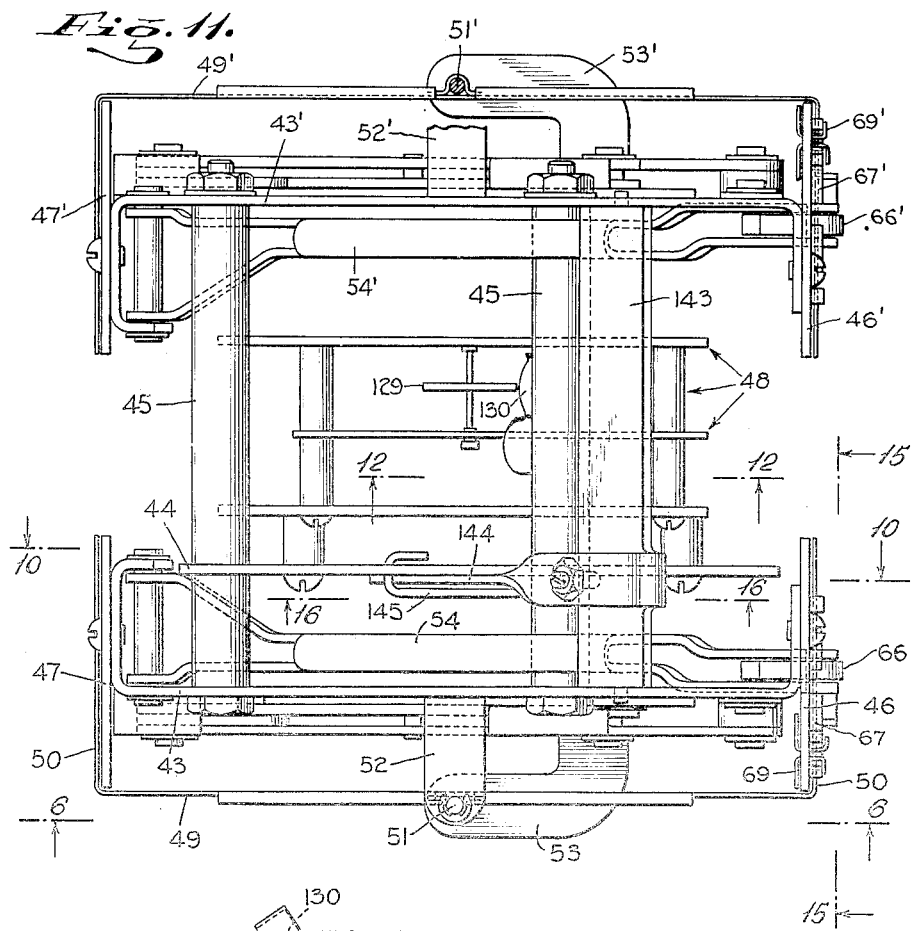
Fig. 11 is a top plan view showing both units of the plural parking space meter.

Referring now to Fig. 11, the entire mechanism is there shown in plan view, as it would be lowered into the housing in the position in which the housing is shown in Fig. 4; that is to say, the lower unit of the mechanism of Fig. 11 is the left-hand unit and the upper is the right-hand unit, the coins entering on the right-hand side in this view.

The structure consists essentially of chassis plates 43, 43' and, between them, a timer mounting plate 44, which three plates are appropriately separated by spacers 45 and bolted together. The chassis plates carry front scale plates 46, 46' and rear scale plates 47, 47' and supported on the plate 44 between the units is the timer 48 which, in this instance, is shown as consisting of a clock. However, even though the clock in this instance is assumed to incorporate its own spring, its sole function during the running of the purchased-time period after the deposit of the coin (as in the diagrammatic arrangements already described) is that of a timer, to retard the movement of the indicators during each parking period.

In the ensuing description the components of only one of the units will be described, but it will be understood that the other unit is identical and the parts corresponding to those specifically described with respect to the one unit are similarly identified by primed characters in the other unit.

The flag or moving part of the indicator consists of a plate 49 (shown in elevation in Fig. 7) of which the ends 50 are bent at right-angles to the body portion. These ends may be assumed to be colored red and to move upwardly over appropriate scales marked on the respective scale plates. In this movement the flag is guided on rod 51 which is supported in upper and lower bracket tabs 52, 53 bent out from the chassis plate.

Referring now to Fig. 6, the major components corresponding to those described at the outset will be recognized as including actuator 54, primary link 55, primary lever 56, lost motion link 57, secondary lever 58, secondary link 59 and flag arm 60, the actuator and the primary and secondary levers being pivoted on the chassis plate on studs 61, 62, 63 respectively. The coin chute 64 is secured to the back of the chassis plate, its upper or entrance end being located adjacent a slot 65 (Fig. 15) in front scale plate 46.

As shown particularly in Figs. 6 and 15, the forward end of actuator 54 projects through slot 65 and is forked. Pivotally suspended between the arms 54x, 54y of the forked end of the actuator is a plate 66 which serves as a coin door, that is to say, it normally blocks coin entrance slot 37 of the housing but is free to be swung inwardly by an entering coin. As shown in Fig. 7, an entering coin swings the coin door up into the dotted line position there indicated, and as the coin is forced inwardly, it raises the actuator, the lower edge of the coin riding on the lower edge of slot 65.

It will be assumed throughout the remainder of the description that the illustrated meter is intended to be operable either by a penny, to purchase say twelve minutes of parking time, or by a nickel, to purchase one hour's parking time. On such assumption, Fig. 7 shows the position of the parts at the instant a penny has been inserted to the point where it is applying its maximum lift to the actuator.

Means are provided to guard against the possibility of someone attempting to force the actuator upwardly to the limit of its travel by means of a firmly held penny and thereby secure one hour of parking time. This means, shown particularly in Fig. 15, comprises a latch 67 mounted on an adjustable pivot 68 on the scale plate and biased by a light spring 69 into such position that the edge 70 of the latch normally lies slightly above the bottom edge of slot 65. In this position of the latch its hook portion 71 overlies the portion 72 of arm 54y of the actuator and thereby blocks the latter against upward movement. When a coin is inserted in the intended manner, it will thus engage edge 70 of the latch and move it downwardly, thereby swinging the hook 71 from the path of the actuator so that continued inward movement of the coin will complete the opening of the coin door and raise the actuator to the extent dictated by the diameter of the particular coin. If on the other hand, a small coin is attempted to be inserted and utilized to force the actuator upwardly, its lower edge will be clear of the edge 70 of the latch and the actuator will remain blocked.

Referring briefly to Fig. 10, which shows the rear of the chassis plate, two springs 73, 74 are indicated, the former serving to hold the actuator in and return it to its lower (inactive) position, and spring 74 constituting the counterbalance or main spring by which the meter mechanism is operated. Anchored at its lower end to the chassis plate, the upper end of spring 74 is attached to a lever 75 which is pinned to stud 63 and the stud in turn is interlocked with secondary lever 58 by a clip 76, one arm of which extends through the stud and which abuts the shoulder 77 (Fig. 6) of the secondary lever. As will be understood, the lower or inactive position of the actuator so obstructs the coin entrance as to leave a slot opening smaller than the diameter of the smallest coin to be used.

Reverting now to Fig. 6, shaft 78 (which corresponds to shaft 17 of the diagrams) is a shaft that in this embodiment is connected to and is driven by the timer or clock 48 and secured to this shaft is a ratchet disc 79. The flag arm 60 is free to rotate relatively to shaft 78 and also freely mounted on the shaft is a time delay cam 80, the periphery of which incorporates a twelve-minute notch 81 and a sixty-minute notch 82. In this particular form of the invention, shaft 78 is a four-hour shaft; that is, it is geared to make one revolution in four hours. Hence, the sixty minute notch is approximately 90° removed and the twelve minute notch 18° removed from the at-rest or upper position of the flag arm. As mentioned above, the linkage and lost-motion are so predetermined that the flag arm motion effected by the nickel approximates the required multiple of the motion effected by the penny.

Pivotally mounted on the branch 83 of the flag arm is a clutch element 84 which has a tooth 85 engageable with the teeth of ratchet disc 79, tooth 85 and the ratchet teeth being so formed that the clutch will permit free movement of the flag arm relatively to the ratchet disc when the flag arm is rotated counter-clockwise (as when a coin is inserted) but are engageable to prevent the flag arm from over-running the ratchet disc in a clockwise direction. The outer end 86 of clutch element 84 serves as the flag support. It may be stated here that the bias of clutch element 84 is such that its tooth 85 only enters into driving engagement with the teeth of the ratchet disc when the weight of the flag is applied to the supporting end 86 of the element. In other words the clutch is flag-controlled (and, in turn, coin-controlled, as presently described).

On the end of the other branch 87 of the flag arm is pivotally mounted a pawl 88 which is biased inwardly by spring 89 so as to enter notch 81 or notch 82 as the flag arm is rotated counter-clockwise. Formed integrally with the pawl is a tooth 90 which overlies the teeth of ratchet disc 79 and is free to enter them when the pawl drops into notch 81 or 82 of the time delay cam 80 which is normally held stationary.

From the description thus far, it will be apparent that when, say, a penny is inserted, the raising of the actuator operates through the described linkage to rotate the flag arm counter-clockwise to permit pawl 88 to drop into time delay cam notch 81, and coincidentally tooth 90 of the pawl engages a tooth of the ratchet disc. The engagement of the tooth 90 with the ratchet disc 79 when the pawl 88 drops into the notch 81 (or notch 82 if a nickel is used) serves to lock the flag arm to the ratchet disc temporarily and prevent the return of the flag arm to its initial position by clockwise rotation of the arm with respect to the ratchet disc under the influence of the spring 74 which has been energized. However, during this period, the spring 74 rotates the arm clockwise at the rate determined by the timer and due to the rotation of the flag arm in this manner, the pawl 88 is cammed out of the notch 81 on the cam 80. When the pawl 88 is cammed out of the notch 81, it disengages the tooth 90 from the ratchet disc and thus permits the spring 74 to return the flag arm to its initial position unless the flag has been dropped onto the flag arm in the meantime and has engaged the flag operated clutch 84 with the ratchet disc 79.

The purpose of this time-delay release is to prevent a parker from obtaining parking time by inserting a coin into the entrance slot only to the maximum diameter of the coin and then withdrawing the coin; that is, without permitting the coin to pass into the meter. As already indicated in connection with the diagrams, and as presently described in detail, the dropping of the flag to indicate the purchase of time is brought about by the descent of the coin within the chute, so that while the indicated maneuver will serve to bring about the cocking of the flag arm mechanism, the parts will shortly return to their initial position unless the inserted coin is permitted to pass all the way into the meter. When a coin is fully inserted, the flag is dropped and its weight engages tooth 85 of the clutch element with the ratchet teeth (see Fig. 13) and the flag arm is thereby interlocked with the ratchet disc and is permitted to return only at the rate dictated by the slow rotation of the ratchet disc, notwithstanding the disengagement, after a short interval, of time delay pawl from notch 81. This is the normal operation during a legitimately purchased parking interval, and it will be understood that the operation is precisely the same when a nickel is inserted, except that the rotation of the flag arm is proportionately greater and that time delay pawl 88 drops into sixty-minute notch 82, as shown in Fig. 14.

The arrangements whereby the flag is supported independently of the flag arm and permitted to drop at the appropriate time will now be described.

Secured to but spaced from the back of the flag is a rack 91, the teeth of which are engageable by the upper end 92 of a flag latch 93 which is pivoted at 94 on the chassis plate (see Figs. 7, 8 and 9). Pivoted on the chassis plate at 95 are a latch lever 96 and a detent 97. The lower end 98 of the latch lever projects through a slot in the coin chute into the path of a descending coin and the upper end 99 of the latch lever overlies the upper end of the latch so that, as a descending coin strikes the latch lever, it rocks it clockwise about its pivot 95 and causes the upper end of the latch lever to move the latch out of engagement with the teeth of rack 91 and so drop the flag and engage the flag arm clutch. These parts are then in the position shown in Fig. 8. The detent 97 is so biased that at this time it swings into the position shown in Fig. 8 with its projection 100 overlying the tail 101 of the latch and blocking it from swinging back into its flag supporting position. The parts continue in this position throughout and even after the termination of each purchased time interval, means being provided for restoring the flag latch to flag supporting position immediately upon the insertion of a coin and even before the flag arm withdraws its support from beneath the flag. These means for resetting the flag latch will now be described.

Reverting again to Fig. 6, a sear 102 is mounted adjacent the chassis plate with freedom for lengthwise movement relatively to the plate. The loop 103 at the upper end of the sear encircles a washer member 104 at the pivot center of primary lever 56, and toward its lower end the sear is guided by a headed stud 105 which rides in sear slot 106. A light spring 107 biases the sear toward the upper end of its stroke, the position shown in Fig. 6. Suspended from primary lever 56 by pivot stud 108 is a trigger 109, the lower end 110 of which abuts a shoulder on the sear so as to move it downwardly as primary lever 56 is rocked about its pivot upon the insertion of a coin. The lower edge of the arm 111 of the trigger is so positioned that, as the trigger is moved downwardly, this edge engages a washer member 112 and so causes the trigger to be cammed in a clockwise direction to disengage its lower end 110 from the sear. Thus, when a coin is inserted, the immediate result is a downward movement of the sear by the trigger, followed by the disengagement of the trigger from the sear, whereupon the latter snaps back to its upper position under the influence of spring 107. This downward movement of the sear causes its lower end 113 to engage detent 97 and move its projection 100 clear of the tail 101 of the flag latch, to permit the latter to swing into flag supporting position (see Fig. 7). The engagement of the flag latch with the teeth of rack 91 is reenforced by a spring 114 which depends from lost motion link 57.

This operation of the flag latch in conjunction with the time delay mechanism previously described prevents a parker from obtaining parking time by inserting a coin (or other tool) into the coin slot and then withdrawing it, as for example, by first inserting a penny in the meter so as to set the meter into normal operation at the twelve-minute point and then inserting a nickel in the coin slot so as to rotate the flag arm (counterclockwise) to the sixty-minute position and then withdrawing the nickel. When this is done, the insertion of the nickel first releases the previously inserted coin (the penny) which permits the flag latch 93 to move back into engagement with the flag rack 91 and prevents the flag from falling as the flag arm is rotated counterclockwise from beneath the flag. Thus, the flag remains in the twelve-minute position and the time-delay mechanism will operate after a short interval (long enough for a coin to pass into the meter and release the flag latch) to release the tooth 90 from the ratchet disc 79 whereupon the spring 74 will return the flag arm to a position where it again engages with the flag. Thus, the only free time gained by the parker would be the time required to cam the pawl 88 out of the sixty-minute notch 82 and release the tooth 90 from the ratchet disc 79.

Up to this point it has been assumed that the time delay cam remained stationary, but it will be observed (Fig. 6) that an arm 115 connects this cam through a pin and slot connection 116 with the sear. In the result, each downward thrust of the sear (every time a coin is inserted) imparts a slight counter-clockwise motion to the time delay cam, which motion is sufficient to disengage pawl 88 from notch 81 or 82. The purpose of this arrangement is to guard against another form of improper manipulation of the meter, as follows:

If a parker should insert a nickel up to its maximum diameter and then withdraw it, the flag arm would be rotated sufficiently to engage pawl 88 with sixty-minute notch 82; and, if nothing further were done, the flag would not drop and after an interval, the time delay pawl would be disengaged and spring 74 would snap the flag arm back, first to its twelve-minute position (where pawl 88 engages notch 81) and then, after another interval, to its initial position in the manner above described. During the first such interval, a parker might conceivably insert a penny, with the thought of dropping the flag and thereby securing sixty minutes of parking time at the cost of one penny. However, such a maneuver is prevented by the described connection between the sear and the time delay cam, for the reason that the very act of inserting a penny under the above conditions immediately brings about the counterclockwise rotation of the time delay cam and the disengagement of pawl 88 from the sixty-minute notch 82, with the result that the flag arm will promptly return under the influence of spring 74 to the point of engagement of pawl 88 with twelve-minute notch 81. Thus, by the time the penny in question reaches the lower part of the coin chute and strikes the flag latch to drop the flag, the flag arm will be in such position that only twelve minutes of purchased time will be secured.

As indicated above, each active coin is held exposed to view at window 42 throughout the purchased time period and the arrangements whereby this is effected and the coin later dropped into the coin box will now be described.

Referring particularly to Figs. 6 and 10, it will be seen that a coin latch 117 is pivoted at 118 on the chassis plate, the latch having a tongue 119 which projects upwardly into position to be engaged by a coin as it arrives at the lower end of the coin chute. Also, the lower edge of the chassis plate is slotted as at 120 to receive the upper part of a coin fence 121 which projects upwardly from a support 122 which is bolted to lugs 123 or otherwise suitably secured to the housing. The part comprising support 122 and coin fence 121 is shown separately in Fig. 5. Tongue 119 and coin fence 121 are so located as to support the coin in position to be observable through window 42 and coin latch 117 is rotatable in a counter-clockwise direction, as viewed in Fig. 6, to withdraw tongue 119 from beneath the coin and drop it into coin box 41.

Such rotation of the coin latch is effected through a lug 124 projecting laterally from the latch adjacent the lower end of lost motion link 57. Adjacent its upper end, the lost motion link is formed with a cam slope 125 which, when link 57 is moved downwards by the insertion of a coin, engages stud 126 so that continuing downward movement of link 57 is accompanied by lateral movement of the link, that is, to the left as viewed in Fig. 6, and it is this lateral movement which causes the lower end of the link to engage lug 124 to rotate coin latch 117 and drop the exposed coin. It will thus be apparent that each coin remains exposed to view at least until another coin is inserted.

It will be noted that the lower portion 127 of the coin chute wall is spaced from coin fence 121 a distance sufficient to pass a coin, the passage thus formed providing an alternate route to the coin box. The only time that this alternate route is used is when the meter is operating as the result of the insertion of a nickel and when a penny is needlessly inserted, that is to say, when more than twelve minutes of the sixty still remain. Under such circumstances, the flag arm and its associated linkage will still be cocked to such a degree that stud 126 will be out of reach, as it were, of cam slope 125. That is to say, the amount of lift imparted to the actuator by a penny will be insufficient to lower cam slope 125 to the point of engagement of that slope with stud 126, with the result that such insertion of a penny will not bring about any lateral movement of lost motion link 57 and accordingly will not drop the nickel which is assumed to be exposed in the window. When, therefore, such penny approaches the normal coin exposing position, it strikes the nickel already there and bounces off into the alternate passage, whence it falls into the coin box.

Coin fence 121 serves an additional purpose. Since the fence support 122 is secured to the meter housing, it will be apparent that as the meter mechanism is lifted out of the housing, the fence stays behind, with the result that its support of any coin then exposed in the window is withdrawn and such coin, being off balance with respect to tongue 119, drops out of the bottom of the mechanism and enters the coin receptacle. It will be understood that in accordance with common practice, the coin receptacle can only be removed from the housing upon the opening of a separate door (not shown) which can only be unlocked by a person authorized to make the collections. Accordingly, the service attendant, who has access only to the meter mechanism by way of the locked cover 36, is unable to get at any window-exposed coins, because the very act of lifting the mechanism out of the housing drops such coins into the coin box.

Figure 12:
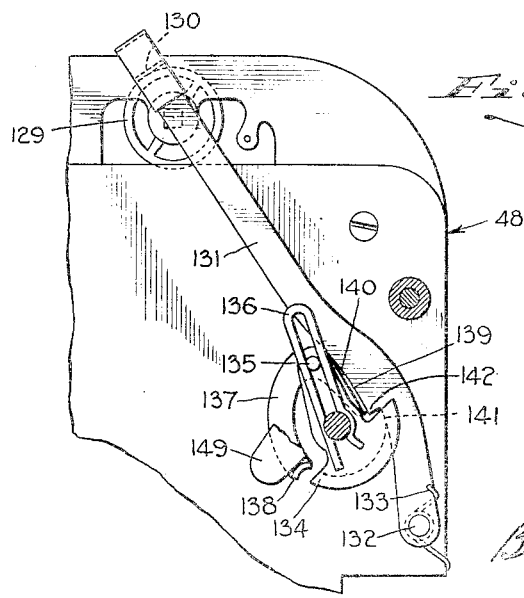
Fig. 12 is a broken-out, sectional view on the line 12—12 of Fig. 11.

In the foregoing detailed description, it may have been assumed that clock-shaft 78 was rotating continuously. Such an arrangement is permissible and the various mechanism operations would take place just as described if that were the case. However, in order to avoid such frequent winding of the clock as would be necessary were it running continuously, it is preferred to incorporate in the meter means for starting the clock in response to the insertion of a coin and for stopping the clock automatically after the purchased time has expired. A preferred form of mechanism for this purpose is illustrated in Figs. 12, 16 and 17.

The illustrated clock 48 is shown more or less diagrammatically because it can be of any standard or appropriate construction. For present purposes, it is sufficient to note that the clock is assumed to include a front plate 128 spaced from clock mounting plate 44, driven shaft 78 (which projects through plate 44 and to which ratchet disc 79 is secured), and balance wheel 129, the clock being stopped by the engagement with the balance wheel of a resilient brake shoe 130 mounted on the free end of brake lever 131 and restarted by the wiping action of the brake shoe as the brake lever is moved from the position shown in Fig. 12 to the position shown in Figs. 16 and 17.

The brake lever is pivoted at 132 on plate 128 and is urged by spring 133 into engagement with cam 134, the arcuate portion of the cam having a grooved periphery. The oppositely projecting tail portion of the cam carries a pin 135 which extends between the arms of a clip 136 which frictionally grips shaft 78 and hence serves as a friction coupling between the cam and the shaft. Pivotally mounted on pin 135 is a jack 137, one arm of which terminates in an upturned flange 138. The other arm 139 of the jack lies adjacent the edge 140 of the brake lever when the mechanism is at rest (Fig. 12) and at this time it will be noted that the recessed portion 141 of the brake lever lies in the peripheral groove of cam 134. When jack 137 is rotated counter-clockwise about pivot 135, the first result is that arm 139 of the jack, by engagement with edge 140 of the brake lever, rotates the latter clockwise about its pivot 132, moving shoulder 142 of the brake lever radially outward a distance sufficient to clear the bottom of the cam groove. Such movement of the brake lever wipes the brake shoe off the balance wheel and so starts the clock. Continuing counter-clockwise rotation of the jack brings flange 138 into engagement with the adjacent portion of cam 134 and moves the latter counter-clockwise about shaft 78 (the friction coupling slipping during such movement). The counter-clockwise movement of cam 134 brings the cam groove beneath shoulder 142 of the brake lever and thereby temporarily holds brake shoe 130 clear of the balance wheel. The slow clockwise rotation of shaft 78, acting through spring clip 136, carries cam 134 with it in a clockwise direction until brake lever shoulder 142 leaves the end of the cam groove and is moved by spring 133 back into the position shown in Fig. 12, which return movement of the brake lever brings the brake shoe 130 back into contact with the balance wheel 129 and stops the clock.

The foregoing mechanism requires only that means be provided, responsive to the insertion of a coin, to rotate jack 137 and cam 134 through such an arc that the time required by shaft 78 to return the jack and cam to their starting positions at least equals the time purchased by the particular coin inserted. In the illustrated embodiment, such means is arranged for operation directly from the actuator 54.

Referring particularly to Figs. 11 and 16, a bar 143 extends between and is pivoted at its ends in chassis plates 43, 43'; and, projecting downward from bar 143, is a pitman arm 144 from which is suspended a drag link 145. The lower end of the drag link encircles a headed stud 146 which projects outwardly from an outer reset lever 147. This lever is mounted adjacent clock mounting plate 44 so as to rotate about the axis of shaft 78; and, immediately behind plate 44, is an inner reset lever 148 which is coupled to the outer reset lever and so oriented with respect to it that the nose 149 of the inner reset lever abuts flange 138 (Fig. 12). In this instance, the outer and inner reset levers (which may be identical stampings) are coupled together by a bushing 150 which turns freely on shaft 78 and projects through an opening in clock mounting plate 44. The end portions of the bushing are provided with flats (of which one marked 151 appears in Fig. 16) by which the reset levers are positioned with respect to each other. It follows that whenever a coin is inserted and actuator 54 thereby raised, it engages bar 143 and rotates it about its pivots, lifting the pitman arm and drag link and rotating the reset levers to effect the starting of the clock in the manner described. After the coin has passed into the meter, the return of actuator 54 under the influence of spring 73 restores the pitman arm, drag link and reset levers to the positions indicated in Fig. 16, leaving jack 137 and cam 134 to be returned by clock-shaft 78. As will be understood, the parts are so proportioned that cam 134 takes something in excess of twelve minutes to be returned by clock-shaft 78 following the insertion of a penny and something in excess of sixty minutes to return following the insertion of a nickel. Obviously, this type of starting and stopping mechanism obviates any necessity for correlating the stopping of the clock precisely with the expiration of the purchased time interval.

As already described, clutch element 84 is interlocked with ratchet disc 79 by tooth 85 throughout each purchased time period and means are provided for disengaging the clutch element at the conclusion of each such period, so that the flag arm can come to rest and the ratchet disc continue to rotate with its teeth clear of tooth 85. Such means are illustrated in Fig. 6.

Pivotally mounted at 152 on the chassis plate is an arm 153 which has a bent over tab 154 projecting through a slot 155 in the chassis plate to limit the downward movement of the arm. That portion of the end of arm 153 which is not bent over forms a finger 156 which, as the flag arm rotates clockwise, is engaged by a pin 157 projecting from the rear of clutch element 84. As the flag arm continues to rotate, pin 157 raises arm 153 and the radius of turning of arm 153 is such that as the flag arm approaches the upper limit of its travel, tab 154 cams pin 157 radially outward far enough to withdraw tooth 85 from the teeth of ratchet disc 79. This is the position of the parts shown in Fig. 6.

Where, as in the foregoing illustrative embodiment of the invention, the timer takes the form of a clock, access for winding it may be provided through a hole in the housing (not shown) located to pass a suitable key to wind stem 158. The winding gear train, marked 159, is indicated in Fig. 16.

Referring now to the alternative construction illustrated in Figs. 18 to 21, the major linkage components will be recognized as being arranged and operating in the same manner as those already described. The corresponding elements are identified by the same reference characters as those used above, followed by the letter *a*. The differences between the two mechanisms are concerned with the following features:

*Lost-motion link.*—At its upper end, lost motion link 57a is not slotted, but is formed with a shoulder 125a which serves the same purpose as the cam slope 125 of lost motion link 57. At its lower end, lost-motion link 57a is formed with a loop 160 which encircles lug 124a of coin latch 117a. Also, a cam element 161 in the form of a tab bent in from the scale plate is located to engage a shoulder 162 on the lost-motion link. Thus, as the lost-motion link moves upward, its lower end is cammed to the right (as viewed in Fig. 18) and, through the engagement of loop 160 with lug 124a, the coin latch is positively returned to its initial position.

*Flag latch.*—In this form the latch lever and detent are omitted and the lower end 163 of latch lever 93a is itself bent over to enter the coin chute in a position to be struck by the descending coin. As will be apparent, such coin will rotate the latch lever clockwise about its pivot 95a, disengage the upper end 92a of the latch from flag rack 91a and will hold the latch out of engagement with the flag as long as the coin continues to be exposed in the window. The insertion of a coin at the entrance slot acts, through the lost-motion link and coin latch, to drop the exposed coin as already described and in this form of the invention the flag latch thereupon swings back by its own weight into position to engage the flag rack.

*Inertia block.*—The action just described unavoidably involves some slight delay in the flag latch reaching its flag supporting position and in this construction means are provided for guarding against the partial descent of the flag (as the result of the lowering of the flag arm) before the flag latch has moved into flag supporting position. Such means include an inertia block 164 which is mounted to swing about the pivot center 63a of secondary lever 58a and which carries at its lower end a hook 165 which, as the block rotates clockwise, swings into engagement with the flag rack (Fig. 19). The inertia block is suspended by link 166 which is slotted at 167 to embrace stud 108a carried by primary lever 56a; and a light spring 168, having one end bearing on the shoulders 169 of link 166, is connected at its other end with the upper portion of link 166. The set of the spring is such that its loop tends to expand. When the linkage is in its idle position, as shown in Fig. 18, that part of spring 168 which bridges shoulders 169 bears against stud 108a and so supports the inertia block in the position shown in that figure. Just as soon as the actuator begins its upward movement in response to pressure of a coin, and primary lever 56a starts to rotate counterclockwise about its pivot 62a, stud 108a moves downward, together with spring 168 and link 166, and immediately the inertia block rotates to engage its hook 165 with the flag rack. Continuing rotation of primary lever 56a simply draws stud 108a downward out of engagement with spring 168, as shown in Fig. 19. After the entering coin has passed into the coin chute, the actuator, primary link and primary lever return to their initial positions (as in the earlier described form of the invention) and stud 108a reengages the portion of spring 168 which bridges shoulders 169. However, due to the weight of the inertia block and the lightness of spring 168, the latter tends to yield under the impact of stud 108a and thereby introduces a slight lag or delay in the return of the inertia block and the withdrawal of its hook 165 from engagement with the flag rack. The result of this arrangement is that the flag is held against dropping prematurely by the initial prompt action of the inertia block upon the insertion of a coin and is held supported a sufficient length of time to afford the flag arm ample opportunity to reach whatever position is appropriate for the particular coin inserted. The rapid engagement of the inertia block hook with the flag rack and its sluggish disengagement, serve also to minimize the possibility of the flag being dropped as the result of a coin being repeatedly and quickly pushed partly into the entrance slot and withdrawn.

*Time delay cam.*—As shown particularly in Fig. 21, the time delay cam 80a is of a somewhat different form from that above described, but it incorporates a twelve minute notch 81a and a sixty minute notch 82a designed to serve the purposes above mentioned. This time delay cam has a tail piece 170 which is urged into engagement with an adjustable stop 171 by spring 172. In lieu of the sear and trigger previously described, this form of the invention utilizes a trigger 173 mounted adjacent its upper end on stud 108a and bearing at its lower end on a roller 174 carried by the time delay cam. Under the influence of a spring 175 secured to its upper end and anchored to the chassis plate, the lower end of trigger 173 is held in engagement with a tab 176, projecting rearwardly from the time delay cam. The operation is substantially as already described in that upon each insertion of a coin, trigger 173 is moved downwardly and, by engagement with roller 174, rotates the time delay cam in a counter-clockwise direction a distance sufficient to disengage the time delay pawl from notch 81a or notch 82a, as the case may be. Such rotation of the time delay cam causes tab 176 to move trigger 173 to the left (as viewed in Fig. 21) so that its lower end falls off the roller and permits the time delay cam to be snapped back to its former position by spring 172.

*Flag arm.*—In this instance, the flag arm is of a somewhat different form (see Figs. 18 and 19), but as before it is rotated by secondary link 59a and carries clutch element 84a and pawl 88a. These parts function as already described except in the details of the manner in which the clutch element is disengaged from the ratchet disc teeth at the upper end of the flag arm movement. In the instant arrangement, the tail of the clutch element 84a is connected to a clutch release slide 177 which is free to move diametrically of the ratchet disc, guided on a washer 178 mounted concentrically with the clock shaft 78a (Fig. 20). As shown in Fig. 18, secondary link 59a engages the clutch release slide as the parts return to their initial position at the end of a purchased time period; and, in so engaging the clutch release slide, link 59a moves it to the left and so disengages the clutch element from the teeth of the ratchet disc.

As shown in the sectional view (Fig. 20), the ratchet disc 79a is secured to a bushing 179 which is driven from the clock shaft 78a by pin 180, the time delay cam 80a and the flag arm 60a being free to rotate on the bushing.

It will be understood that the terminology employed throughout the foregoing description is used for convenience only and not in any restrictive sense; also, that the principles exemplified by these illustrative forms are capable of embodiment in a variety of constructions without departing from the spirit of the invention or from the scope of the appended claims.

In the light of the foregoing, the following is claimed:

1. In a parking meter of the kind including a coin slot accessible to the parker, a coin chute within the meter for guiding the gravity fall of a coin after it has passed through the slot, an indicator movable between violation and purchased-time positions, spring-controlled means adapted to be moved in one direction for potentially energizing the same and movable in the reverse direction to apply its energy to move the indicator from purchased-time to violation position, and timer mechanism for retarding the indicator movement, the improvement which comprises an actuator adjacent the coin slot positioned for engagement by and yieldable in response to the insertion pressure of a hand-held coin, motion-multiplying connections between the actuator and said spring-controlled means, said connections applying the said coin-induced yield of the actuator to move the spring-controlled means in said one direction, timer-controlled clutch means between the spring-controlled means and the timer mechanism, said timer-controlled clutch means temporarily connecting the spring-controlled means to the timer upon movement of the spring-controlled means in an energy-storing direction, an indicator-controlled clutch means between the spring-controlled means and the timer mechanism, said indicator-controlled clutch being operable by the indicator to connect the spring-controlled means to the timer independently of the timer-controlled clutch, and latch means for maintaining the indicator in its violation position, said latch means including a release element located in the path of a coin falling through the chute.

2. In a parking meter of the kind including a coin slot accessible to the parker and adapted for edge-wise receipt of coins of different diameters, an indicator movable between a violation and different purchased-time positions, spring-controlled means adapted to be moved in one direction for potentially energizing the same and movable in the reverse direction to apply its energy to move the indicator from the purchased-time positions to violation position, and timer mechanism for retarding the indicator movement, the improvement which comprises a pressure-yieldable member having a portion adjacent the coin slot positioned to restrict the normal opening thereof to a dimension less than the diameter of the smaller of the said coins, whereby said member is engaged by and caused to yield to different extents in response to the insertion pressure of each of the different hand-held coins, motion-multiplying connections between the pressure-yieldable member and said spring-controlled means, said connections applying the different coin-induced yields of said member to move the spring-controlled means in said one direction and clutch means between the spring-controlled means and the timer mechanism, said clutch means including an operating arm positioned for engagement with the indicator at purchased-time positions thereof, said arm engaging the clutch upon engagement of the arm by the indicator.

3. In a parking meter of the kind including a coin slot accessible to the parker and adapted for edge-wise receipt of coins of different diameters, an indicator movable between a violation and different purchased-time positions, spring-controlled means adapted to be moved in one direction for potentially energizing the same and movable in the reverse direction to apply its energy to move the indicator from the purchased-time positions to violation position, and timer mechanism for retarding the indicator movement, the improvement which comprises a pressure-yieldable member having a portion adjacent the coin slot positioned to restrict the normal opening thereof to a dimension less than the diameter of the smaller of the said coins, whereby said member is engaged by and caused to yield to different extents in response to the insertion pressure of each of the different hand-held coins, motion-multiplying connections between the pressure-yieldable member and said spring-controlled means, said connections applying the different coin-induced yields of said member to move the spring-controlled means in said one direction and coin-controlled clutch means between the spring-controlled means and the timer mechanism said clutch means including an operating member positioned for engagement by the indicator at purchased-time positions thereof, said clutch operating member engaging the clutch upon engagement of said member by the indicator.

4. In a parking meter of the kind including a coin slot accessible to the parker and adapted for edge-wise receipt of coins of different diameters, an indicator movable between a violation and different purchased-time positions, spring-controlled means adapted to be moved in one direction for potentially energizing the same and movable in the reverse direction to apply its energy to move the indicator from the purchased-time positions to violation position, and timer mechanism for retarding the indicator movement, the improvement which comprises a pressure-yieldable member having a portion adjacent the coin slot positioned to restrict the normal opening thereof to a dimension less than the diameter of the smaller of the said coins, whereby said member is engaged by and caused to yield to different extents in response to the insertion pressure of each of the different hand-held coins, motion-multiplying connections between the pressure-yieldable member and said spring-controlled means, said connections applying the different coin-induced yields of said member to move the spring-controlled means in said one direction, and clutch means between the spring-controlled means and the timer mechanism said clutch means including an operating member positioned for engagement by the indicator at purchased-time positions thereof, said clutch operating member engaging the clutch upon engagement of said member by the indicator.

5. In a meter of the character described, the combination with an indicator movable between violation and purchased-time positions, of timer mechanism including a disk adapted to rotate at a predetermined speed, an indicator actuator member adjacent and rotatable about the axis of the disk, spring means operatively associated with the actuator member and biased, when energized, to rotate the actuator member in the direction of rotation of the timer disk, said actuator member being rotatable in the reverse direction to energize said spring means, coin-controlled means for moving the actuator member in the said reverse direction, and indicator-operable clutch means associated with the actuator member and being rotatable about said timer disk upon rotation of the actuator member in said one direction, said clutch means including an operating arm positioned for actuation by the indicator upon movement of the indicator from violation to purchased-time position, the actuation of said arm by the indicator engaging the clutch and coupling the actuator member to the disk in the said direction of rotation of the latter.

6. In a parking meter of the kind including a coin slot accessible to the parker, an indicator movable between violation and purchased-time positions and spring-controlled means adapted to be moved in one direction for potentially energizing the same and movable in the reverse direction to apply its energy to move the indicator from purchased-time to violation position, the improvement which comprises an actuator adjacent the coin slot positioned for engagement by and yieldable in response to the insertion pressure of a hand-held coin, motion-multiplying connections between the actuator and said spring-controlled means, said connections applying the said coin-induced yield of the actuator to move the spring-controlled means in said one direction, a timer mechanism, and a movable clutch connected to the actuator and connecting the spring-controlled means to the timer mechanism, said clutch having an operating arm positioned for engagement with the indicator at purchased-time position thereof, said arm engaging the clutch upon engagement of the arm by the indicator.

7. In a parking meter of the kind including a coin slot accessible to the parker, an indicator movable between violation and purchased-time positions, spring-controlled means adapted to be moved in one direction for potentially energizing the same and movable in the reverse direction to apply its energy to move the indicator from purchased-time to violation position, and timer mechanism for retarding the indicator movement, the improvement which comprises an actuator adjacent the coin slot positioned for engagement by and yieldable in response to the insertion pressure of a hand-held coin, motion-multiplying connections between the actuator and said spring-controlled means, said connections applying the said coin-induced yield of the actuator to move the spring-controlled means in said one direction, an indicator-controlled clutch carried by the spring-controlled means and connecting the spring-controlled means to the timer, said clutch including an operating arm positioned for engagement with the indicator, said arm being movable into clutch engaging position upon engagement of the arm with the indicator and latch means for maintaining the indicator in its violation position, said latch means including a release element located for engagement by a coin beyond the point of its engagement with said actuator.

8. In a parking meter, the combination of an indicator movable between violation and purchased-time positions, a rotatable indicator actuating element rotatable between violation and purchased-time positions, and a coin slot accessible to the parker, a spring associated with said element and adapted to be energized by rotation thereof from violation to purchased-time position and to rotate said element in the reverse direction from purchased-time to violation position, a movable member adjacent the coin slot positioned for engagement by and yieldable in response to the insertion pressure of a hand-held coin, motion-multiplying connections between said member and said element for rotating the same from violation to purchased-time position and thereby coincidentally energizing said spring, a timer mechanism, a clutch carried by the rotatable element and coupling said element to the timer for retarding the return rotation thereof from purchased-time to violation position said clutch including a clutch engaging member, engaging with and operable by the indicator.

9. In a parking meter of the kind including two coin slots and associated indicators for the independent parking control of two cars, a common shaft rotatable in one direction, an associated timer device adapted to limit the speed of rotation of the shaft in said one direction, and an indicator actuating member for each indicator independently rotatable about the axis of said shaft, the combination of a power element associated with each of said members and biased, when energized, to rotate its respective member in said one direction, and a one-way clutch between each of said members and the shaft, each said clutch adapted to couple its associated member to the shaft in said one direction, whereby the speed of rotation of each said member in said one direction under the influence of its power element is controlled by the timer device, said one-way clutches permitting free rotation of their associated members relatively to the shaft in the reverse direction.

10. In a parking meter of the kind incorporating two indicators for the parking control of two cars, the combination of two independent power sources, a single timer mechanism, drive connections from each of said power sources to one of the indicators for moving the same from purchased-time to violation position and from each of said power sources to said single timer each of said drive connections including a movable clutch connecting the respective power sources to the single timer.

11. In a parking meter of the kind incorporating two indicators for the parking control of two cars, the combination of two independent power sources, an escapement, drive connections from both power sources to the escapement, said drive connections each including a movable clutch connecting the respective power sources to the escapement and individual drive connections from each power source to one of the indicators.

12. In a parking meter of the kind having a coin chute, a coin slot at the chute entrance, an indicator biased to move from violation to purchased time position, and power means for moving the indicator at timing rate from purchased time to violation position, including an indicator actuating arm movable away from the indicator in the violation position of the latter, the combination of an indicator latch for holding the indicator in its said violation position independently of said arm, a member positioned adjacent the coin slot for engagement by and yieldable in response to the insertion pressure of a hand held coin, a latch control member, connections between said members for moving the latch into indicator holding position, and a latch release member positioned in the chute for engagement by a coin subsequent to its engagement with said first-mentioned member.

13. In a parking meter of the kind having coin chute, a coin slot at the chute entrance, an indicator biased to move from violation to purchased time position and power means for moving the indicator at timing rate from purchased time to violation position, including an indicator actuating arm movable away from the indicator in the violation position of the latter, the combination of an indicator latch for holding the indicator in its said violation position independently of said arm, a member positioned adjacent the coin slot for engagement by and yieldable in response to the insertion pressure of a hand held coin, a latch control member, connections between said first-mentioned member and said arm for moving the latter away from the indicator, connections between said members for coincidentally moving the latch into indicator holding position, and a latch release member located for engagement by a coin passing through the chute.

14. In a parking meter of the kind including an indicator biased to move from violation to purchased-time position, spring-controlled means for moving the indicator from purchased-time position to violation position, a coin receiving slot accessible to the parker, a coin chute for receiving coins passed through the slot, and timer mechanism for retarding the said indicator movement from purchased-time position to violation position, the combination of a movable member positioned adjacent the coin slot for engagement by and yieldable in response to the insertion pressure of a hand-held coin, connections between said member and said spring-controlled means adapted for energizing the latter in response to the coin-induced yield of said member, a clutch connection between the said spring-controlled means and the timer mechanism, including a clutch engaging element positioned for engagement by the indicator upon movement thereof to purchased time position, an indicator latch for holding the indicator in violation position and a latch release member positioned for engagement by a coin passing through the chute.

15. In a parking meter of the kind including a coin slot accessible to the parker, a coin chute within the meter for guiding the gravity fall of a coin after it has passed through the slot, an indicator movable between violation and purchased-time positions, spring-controlled means adapted to be moved in one direction for potentially energizing the same and movable in the reverse direction to apply its energy to move the indicator from purchased-time to violation position, and timer mechanism for retarding the indicator movement, the improvement which comprises an actuator adjacent the coin slot positioned for engagement by and yieldable in response to the insertion pressure of a hand-held coin, motion-multiplying connections between the actuator and said spring-controlled means, said connections applying the said coin-induced yield of the actuator to move the spring-controlled means in said one direction, latch means for maintaining the indicator in its violation position, said latch means including a release element located in the path of a coin falling through the chute and indicator-controlled clutch means for connecting the spring-controlled means to the timer, said clutch means being movable in response to movement of the spring-controlled means and having a pivoted operating arm positioned for actuation by the indicator upon movement of the indicator from violation position to a purchased-time position, the actuation of said arm by the indicator engaging the clutch means and connecting the timer to the spring-controlled means.

16. In a meter of the character described, the combination with an indicator movable between violation and purchased-time positions, a coin slot accessible to the parker and timer mechanism including a disk adapted to rotate at a predetermined speed, of an indicator actuator adjacent and rotatable about the axis of the disk, spring-controlled means connected with the actuator and biased, when energized, to rotate the actuator in the direction of rotation of the timer disk, said actuator being rotatable in the reverse direction to energize said spring-controlled means, an indicator operable clutch connected to the actuator and being rotatable about the timer disk upon rotation of the actuator member in said reverse direction, said clutch including an operating arm positioned for actuation by the indicator upon movement of the indicator from violation to purchased-time position to connect the actuator to the timer mechanism, a movable member adjacent the coin slot positioned for engagement by and yieldable in response to the insertion pressure of a hand-held coin, and motion-multiplying connections between said member and said actuator for moving the latter in said reverse direction.

17. In a parking meter of the type incorporating two indicators for parking control of two cars, the combination of two sources of power, each of said sources of power being independently energizable for moving one of the indicators from purchased-time to violation position, a single timer mechanism for controlling the expenditure of energy by either of said power sources in moving the indicators from purchased-time to violation position and driving connections connecting each of the sources of power to the timer mechanism, said driving connections each including an overrunning clutch connecting one of the power sources to the timer mechanism.

18. In a parking meter of the type incorporating two indicators for parking control of two cars, the combination as defined in claim 17 wherein the driving connections between the independently energizable sources of power and the timer includes a common shaft connected to the timer and connected to the sources of power through the overrunning clutches.

19. In a parking meter of the type incorporating two indicators for parking control of two cars, the combination as defined in claim 17 which includes a separate coin-operated mechanism for energizing each of the independently energizable sources of power.

20. In a parking meter of the type incorporating two indicators for parking control of two cars, the combination as defined in claim 17 which includes a separate coin-operated mechanism for energizing each of the independently energizable sources of power, a housing enclosing both of said indicators and the mechanisms for operating the same, said housing having coin slots therein permitting entrance of coins into the housing for engagement with each of said coin-operated means.

21. In a parking meter of the type incorporating two indicators for parking control of two cars, the combination as defined in claim 17 which includes a separate coin-operated mechanism for energizing each of the independently energizable sources of power, a housing enclosing both of said indicators and the mechanisms for operating the same, said housing having coin slots therein permitting entrance of coins into the housing for engagement with each of said coin-operated means and resiliently held gate means normally closing the coin slots in the housing.

22. In a twin parking meter incorporating a pair of coin entrance slots, the combination of a pair of indicators each movable in one direction to a purchased time position and in an opposite direction to a violation position; independent power means for moving the respective indicators in one of said directions; an actuator yieldingly mounted adjacent each coin entrance slot, each actuator being positioned for engagement and displacement by a coin inserted in the adjacent slot; connections between each actuator and one of the said power means, whereby coin-induced movement of each actuator is applied to energize one of said power means; and a single timing device coupled to both indicators to control their rate of movement from purchased time to violation position.

23. In a twin parking meter incorporating a pair of coin entrance slots, the combination of a pair of indicators each movable in one direction to a purchased time position and in an opposite direction to a violation position; independent power means for moving the respective indicators in one of said directions; an actuator yieldingly mounted adjacent each coin entrance slot, each actuator being positioned for engagement and displacement by a coin inserted in the adjacent slot; connections between each actuator and one of the said power means, whereby coin-induced movement of each actuator is applied to energize one of said power means; a single timing device having coupling connections to both indicators to control their rate of movement from purchased time to violation position; and clutch means incorporated in each of said coupling connections.

ROY S. SANFORD.
JAMES OWEN EAMES.

REFERENCES CITED

The following references are of record in the file of this patent:

UNITED STATES PATENTS

| Number | Name | Date |
|---|---|---|
| 1,242,551 | Helsel | Oct. 9, 1917 |
| 1,826,398 | Hayden | Oct. 6, 1931 |
| 1,848,626 | Hall | Mar. 8, 1932 |
| 2,209,249 | Long et al. | July 23, 1940 |
| 2,228,396 | Martin | Jan. 14, 1941 |
| 2,264,479 | Munson | Dec. 2, 1941 |
| 2,267,857 | Dietrich | Dec. 30, 1941 |
| 2,269,021 | Hazard | Jan. 6, 1942 |
| 2,359,754 | Fink | Oct. 10, 1944 |

FOREIGN PATENTS

| Number | Country | Date |
|---|---|---|
| 17,440 | Great Britain | Aug. 8, 1902 |
| 323,179 | Great Britain | Dec. 16, 1929 |
| 472,012 | Great Britain | Sept. 15, 1937 |